US 9,823,471 B2

(12) United States Patent
Kim et al.

(10) Patent No.: US 9,823,471 B2
(45) Date of Patent: Nov. 21, 2017

(54) DISPLAY DEVICE

(71) Applicant: LG ELECTRONICS INC., Seoul (KR)

(72) Inventors: Dongwook Kim, Seoul (KR); Xuelong Xu, Seoul (KR); Kyoungil Lee, Seoul (KR); Minhyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/053,126

(22) Filed: Feb. 25, 2016

(65) Prior Publication Data
US 2017/0038583 A1 Feb. 9, 2017

(30) Foreign Application Priority Data

Aug. 5, 2015 (KR) .................. 10-2015-0110447

(51) Int. Cl.
*G02B 27/01* (2006.01)
*B60R 1/00* (2006.01)
*G02B 27/00* (2006.01)

(52) U.S. Cl.
CPC ............ *G02B 27/0101* (2013.01); *B60R 1/00* (2013.01); *G02B 27/0093* (2013.01); *G02B 27/0149* (2013.01); *B60R 2300/205* (2013.01); *B60R 2300/50* (2013.01); *G02B 2027/0123* (2013.01); *G02B 2027/0154* (2013.01); *G02B 2027/0181* (2013.01)

(58) Field of Classification Search
CPC . B60R 1/00; B60R 2300/205; B60R 2300/50; G02B 2027/0123; G02B 2027/0154; G02B 2027/0181; G02B 27/0093; G02B 27/0101; G02B 27/0149

See application file for complete search history.

(56) References Cited

U.S. PATENT DOCUMENTS 3,945,716 A 3/1976 Kinder
5,760,931 A * 6/1998 Saburi ................ G02B 27/0101
345/7

(Continued)

FOREIGN PATENT DOCUMENTS

EP 2351668 A2 8/2011
EP 2 869 114 A1 5/2015

(Continued)

*Primary Examiner* — Dmitriy Bolotin
(74) *Attorney, Agent, or Firm* — Birch, Stewart, Kolasch & Birch, LLP

(57) ABSTRACT

A Head Up Display (HUD) device in a vehicle and including a display panel configured to output an image containing driving information; a concave mirror configured to reflect the image to a windshield of the vehicle, so as to display a virtual image via the windshield in a forward direction of a driver of the vehicle, wherein the virtual image corresponds to a view box being an area in which the entire image containing the driving information is seen by the driver; a sensing unit configured to sense a position of the driver; a drive unit configured to move the concave mirror, and a controller configured to control the drive unit to correspondingly move the concave mirror in order to move the view box when the sensing unit senses a variation in the position of the driver.

15 Claims, 7 Drawing Sheets

(56) References Cited

U.S. PATENT DOCUMENTS

| | | | | |
|---|---|---|---|---|
| 5,905,477 A * | 5/1999 | Kuwayama | B60K 35/00 | 345/7 |
| 8,928,983 B2 * | 1/2015 | Horiuchi | G02B 27/0101 | 359/630 |
| 2006/0203351 A1 * | 9/2006 | Kageyama | G02B 27/0101 | 359/630 |
| 2009/0237803 A1 * | 9/2009 | Hotta | G02B 3/005 | 359/630 |
| 2009/0278765 A1 * | 11/2009 | Stringfellow | G02B 27/01 | 345/7 |
| 2010/0066832 A1 * | 3/2010 | Nagahara | G02B 7/1822 | 348/148 |
| 2010/0157430 A1 * | 6/2010 | Hotta | G02B 27/01 | 359/630 |
| 2010/0164702 A1 * | 7/2010 | Sasaki | G01B 21/22 | 340/438 |
| 2011/0001639 A1 * | 1/2011 | Sasaki | G02B 27/0101 | 340/995.19 |
| 2011/0187844 A1 * | 8/2011 | Ogawa | B60R 1/00 | 348/78 |
| 2012/0075708 A1 * | 3/2012 | Hagiwara | B60K 35/00 | 359/630 |
| 2012/0242694 A1 * | 9/2012 | Hotta | G02B 27/01 | 345/633 |
| 2012/0268351 A1 * | 10/2012 | Sasaki | G01C 21/365 | 345/8 |
| 2014/0177064 A1 * | 6/2014 | Sugiyama | G02B 27/0101 | 359/630 |
| 2015/0103408 A1 * | 4/2015 | Nishima | B60K 35/00 | 359/618 |
| 2015/0130687 A1 * | 5/2015 | Kitamura | G02B 27/01 | 345/7 |
| 2015/0170343 A1 | 6/2015 | Kwak | | |
| 2015/0226964 A1 * | 8/2015 | Sasaki | G02B 27/0149 | 359/631 |
| 2016/0025973 A1 * | 1/2016 | Guttag | G02B 27/0101 | 345/7 |
| 2016/0062117 A1 * | 3/2016 | Imasaka | G02B 27/0101 | 345/7 |

FOREIGN PATENT DOCUMENTS

| | | |
|---|---|---|
| JP | 2003-287707 A | 10/2003 |
| JP | 2008-132005 A | 6/2008 |
| JP | 4847627 B1 | 12/2011 |
| JP | 2012-163613 A | 8/2012 |
| KR | 10-2009-0017212 A | 2/2009 |
| KR | 10-2010-0026466 A | 3/2010 |
| KR | 10-2015-0071471 A | 6/2015 |
| WO | WO 2007/014180 A2 | 2/2007 |

* cited by examiner

DISPLAY DEVICE

Pursuant to 35 U.S.C. §119(a), this application claims the benefit of Korean Patent Application No. 10-2015-0110447, filed on Aug. 5, 2015, which is hereby incorporated by reference as if fully set forth herein.

BACKGROUND OF THE INVENTION

Field of the Invention

The present invention relates to a display device and, more particularly, to a Head Up Display (HUD) device for vehicles, which can effectively transmit driving information to a driver while a vehicle is being driven.

Discussion of the Related Art

In order to more effectively transmit driving information to a driver while a vehicle is being driven, a next generation display device called a Head Up Display (HUD) device is being actively studied. In more detail, a HUD device is a front display device that displays driving information on the windshield of a vehicle while the vehicle is being driven. This was originally introduced in airplanes.

HUD devices are now being applied to vehicles. In particular, because vehicle displays including a navigation system are often inconvenient to use and may cause accidents because the driver has to take their eyes off the road, the HUD device is being considered to replace or complement these vehicle displays.

In addition, the HUD device displays helpful driver information in a three-dimensional way and in the driver's forward field of view, so as to overlap the scene in front of the vehicle. Thus, drivers of vehicles equipped with HUD devices do not need to move their eyes while driving in order to check, for example, the RPM of the vehicle. That is, the RPM of the vehicle, a fuel indicator, oil pressure, etc. can be displayed by the HUD device.

However, because in vehicles, unlike airplanes, the scene in front of the vehicle constantly changes, the reflective surface of the windshield requires a high reflectance in order to ensure sufficient perception of displayed images, and the transmittance of the windshield must be 70% or more in order to secure forward visibility.

In more detail, FIG. 1 is a view schematically illustrating a related art HUD device. Referring to FIG. 1, in the related art display device, a display panel 10 configured to display driving information such as the RPM of a vehicle, traffic information, and navigation information, outputs the information as an image 12 via a screen thereof, and the output image is reflected by a concave mirror 30 and directed to a windshield 500.

Then, the image projected on the windshield 500 is reflected and transmitted to the driver's eyes. In addition, the image transmitted to the driver's eyes overlaps the scene in the driver's forward field of view, thereby being perceived as a virtual image 70 by the driver. In order to transmit a large amount of driving information to the driver, the size of the virtual image may be increased. Although there are various methods for increasing the size of the virtual image, the size of the concave mirror is generally the most significant factor.

This is because the image 12 output from the display panel 10 is reflected by the size of the concave mirror. In other words, the concave mirror serves as a window. Thus, the virtual image, which is visible via the windshield, is an image that has successfully passed through the window, i.e., the concave mirror. However, increasing the surface area of the concave mirror increases the volume of the display device.

In addition, in order to install the HUD device in the limited space inside the vehicle, the volume of the HUD device needs to be minimized. Reducing the size of the concave mirror is one way of reducing the volume of the HUD device. However, this problematically reduces the driver's view box E. That is, the embodiment illustrated in FIG. 1 suffers from a reduction in the driver's view box E when the size of the concave mirror is reduced.

SUMMARY OF THE INVENTION

Accordingly, one object of the present invention is to provide a display device that substantially obviates one or more problems due to limitations and disadvantages of the related art.

Another object of the present invention is to provide a novel HUD device.

Still another object of the present invention is to minimize the volume of a HUD device, thereby allowing the HUD device to be easily installed in a vehicle having a limited space.

Yet another object of the present invention is to provide a larger view box than a view box that can be made using the concave mirror provided in the HUD device.

To achieve these objects and other advantages and in accordance with the purpose of the invention, as embodied and broadly described herein, in accordance with an aspect of the present invention, the present invention provides a Head Up Display (HUD) device in a vehicle and including a display panel configured to output an image containing driving information; a concave mirror configured to reflect the image to a windshield of the vehicle, so as to display a virtual image via the windshield in a forward direction of a driver of the vehicle, wherein the virtual image corresponds to a view box being an area in which the entire image containing the driving information is seen by the driver, a sensing unit configured to sense a position of the driver; a drive unit configured to move the concave mirror, and a controller configured to control the drive unit to move the concave mirror in order to correspondingly move the view box when the sensing unit senses a variation in the position of the driver. The present invention also provides a corresponding method of controlling the HUD device.

In another aspect, the present invention provides a Head Up Display (HUD) device in a vehicle and including a display panel configured to output an image containing driving information; a combiner configured to reflect a portion of the image towards a driver of the vehicle and to pass a remaining portion of the image to a windshield of the vehicle, so as to display a virtual image via the windshield in a forward direction of a driver of the vehicle, wherein the virtual image corresponds to a view box being an area in which the entire image containing the driving information is seen by the driver; a sensing unit configured to sense a position of the driver, a drive unit configured to move the combiner, and a controller configured to control the drive unit to move the combiner in order to correspondingly move the view box when the sensing unit senses a variation in the position of the driver. The present invention also provides a corresponding method of controlling the HMD device.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Figure 1:
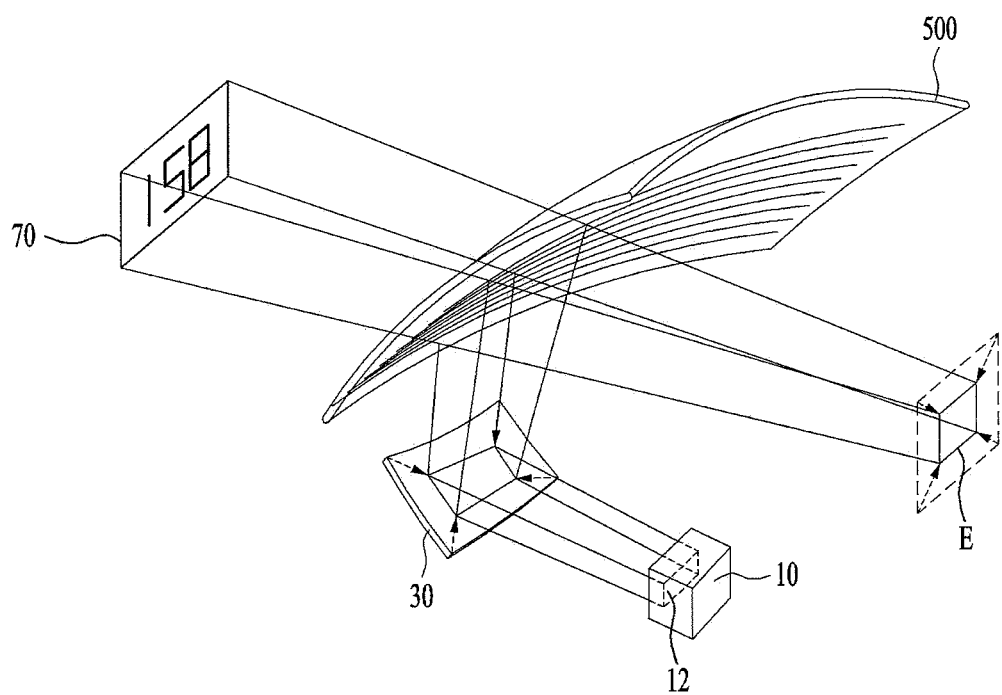
FIG. 1 is a view schematically illustrating related art HUD device.

Hereinafter, exemplary embodiments of the present invention will be described in detail with reference to the accompanying drawings. In addition, the configuration or control method of a device that will be described hereinafter is provided for explanation of the embodiments of the present invention, and is not intended to limit the technical range of the present invention. The same reference numerals throughout the entire specification designate the same constituent elements.

Figure 2:
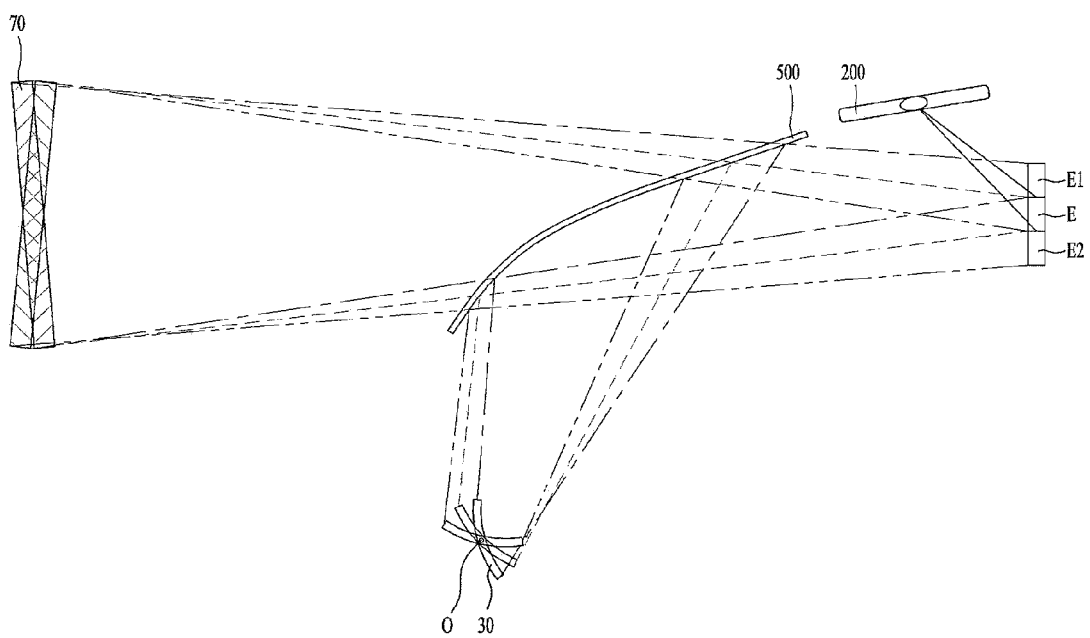
FIG. 2 is a view schematically illustrating a display device in accordance with one embodiment of the present invention.
Figure 3:
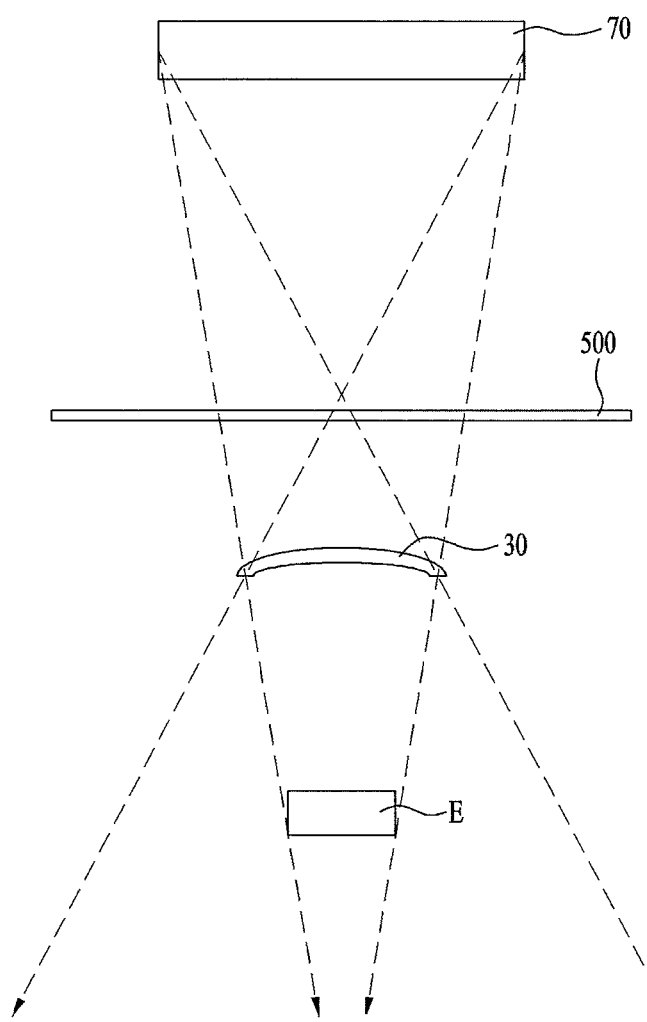
FIG. 3 is a view schematically illustrating the mechanism of the display device in accordance with one embodiment of the present invention.

FIGS. 2 and 3 are views schematically illustrating a display device. As shown, the display device includes the display panel 10 and the concave mirror 30 similar to that shown in FIG. 1. In more detail, the display panel 10 displays an image containing driving information to the driver such as the condition of the vehicle, road information on which the vehicle is being driven, and navigation information. In addition, the kinds of the display panel 10 include, for example, a Liquid Crystal Display (LCD) panel, a Light Emitting Diode (LED) panel, and an Organic Light Emitting Diode (OLED) panel. Further, the concave mirror 30 reflects the image containing the driving information to the windshield 500 and is generally provided to enlarge the image.

In addition, the image reflected by the concave mirror 30 is reflected by the windshield 500 and transmitted to the driver. In particular, the image transmitted to the driver overlaps the scene in the driver's forward field of view and is thus perceived by the driver as a virtual image located at a position forwardly spaced in front of the windshield 500.

Further, the windshield 500 in one embodiment of the present invention has a higher reflectance than a general glass windshield. Thus, the windshield 500 reflects the image to the driver and transmits light at a given rate so as to assist the driver in viewing the forward scene. In addition, the relationship between the size of the concave mirror 30, the size of a virtual image 70, and the driver's view box E will be described below with reference to FIG. 3.

In more detail, the driver's view box E is the area in which the entire image 12 on the display panel 10 is displayed as the virtual image 70. In this area, the driver can view the complete image containing the driving information. This is accomplished because the angle of incidence is the same as the angle of reflection. Thus, when the image 12 introduced into the concave mirror 30 is reflected and displayed as the virtual image 70, the driver's view box E is determined in a given area at the angle of reflection which is the same as the angle of incidence of the light constituting the image. However, when the position of the driver deviates from the view box E, the driver cannot view the image.

In other words, based on the position of the driver, multiple areas exists including an area of the view box E in which the entire image 12 on the display panel 10 is visible, an area in which a portion of the image 12 is cut off and therefore not visible, and an area in which none of the image 12 is visible. More specifically, the size of the view box E is determined according to the size of the virtual image 70 formed outside the windshield 500, or the size of the concave mirror 30. That is, the size of the view box E increases as the size of the virtual image 70 decreases or as the size of the concave mirror 30 increases.

Therefore, increasing the size of the virtual image 70 in order to transmit large amounts of driving information to the driver, or reducing the size of the concave mirror 30 in order to reduce the volume of the HUD device problematically reduces the size of the view box E. In addition, when the virtual image 70 has a predetermined size, the size of the concave mirror 30 must increase in order to widen the view box E. However, this increases the volume of the HUD device. Because the HUD device is installed in a limited space inside the vehicle, the volume of the HUD device is also limited.

Embodiments of the present invention solve the above-noted problems. In particular, the position of the driver's view box E is varied by tracking the position of the driver and correspondingly adjusting the angle of the concave mirror 30. The embodiments of the present invention thus provide the driver with a substantially enlarged view box E. Therefore, the embodiments of the present invention provide a display device capable of displaying an image containing the driving information despite a variation in the position of the driver.

In addition, even if the size of the concave mirror 30 is reduced in order to reduce the volume of the HUD device, the embodiments of present invention can maintain the size of the view box E substantially the same size as in the related art by varying the position of the view box E. Thus, the display device provides a view box that can have the same size as in the related art while achieving a reduced volume thereof because of the reduction in the size of the concave mirror.

Figure 4:
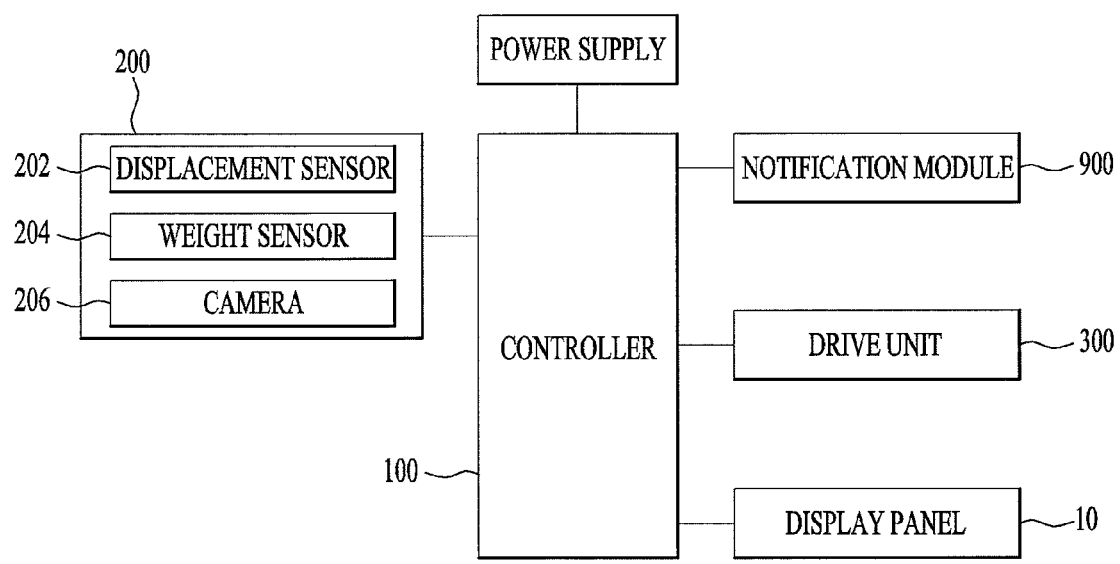
FIG. 4 is a block diagram illustrating the display device in accordance with one embodiment of the present invention.

As shown in FIG. 4, the display device includes a controller 100, a display panel 10, a drive unit 300, a notification module 900 and a sensing unit 200. The sensing unit 200 senses the position of the driver or a displacement in the driver's position. In more detail, the sensing unit 200 senses, for example, the movement of the driver's head, the movement of the driver's eyes, and the movement of the center of weight of the driver.

That is, in order to sense the movement of the driver's head, the sensing unit 200 can include a plurality of displacement sensors 202 to sense a variation in displacement. Alternatively, in order to sense the movement of the center of weight of the driver, the sensing unit 200 can include a weight sensor 204 provided in the driver seat. Also, in order to sense the movement of the driver's head or the movement of the driver's eyes, the sensing unit 200 can include a camera 206 capable of tracking the driver.

For example, an IR camera or an IR sensor can be used as eye tracking technology to sense the movement of the eyes. When the tracking camera 206 is included, the tracking camera 206 can be provided near an upper end of the windshield 500 or near a rear-view mirror inside the vehicle, so as to sense the movement of the driver's eyes or the driver's head. Further, the tracking camera 206 can send an image, which captures the movement of the driver, to the controller 100. The controller 100 can then sense the variation in the position of the driver's eyes by analyzing image information. In addition, the tracking camera 206 may include a camera controller, which analyzes the image showing the movement of the driver and senses the variation in the position of the driver's eyes.

In addition, the drive unit 300 moves the concave mirror 30. In other words, the drive unit 300 can be provided at the concave mirror 30 and supply driving power required to move the concave mirror 30. In this instance, the drive unit 300 can vertically or horizontally rotate the concave mirror 30. As such, the drive unit 300 moves the concave mirror 30 according to the movement of the driver's eyes sensed by the sensing unit 200 or the controller 100.

When the concave mirror 30 is rotated by the drive unit 300, the concave mirror 30 can be rotated in which the center point O of the concave mirror 30 is fixed. However, the concave mirror 30 can be rotated about a prescribed point in the concave mirror 30, instead of the center point O.

In addition, the drive unit 300 preferably finely adjusts the movement or rotation of the concave mirror 30. This is because the displacement or the rotation angle of the virtual image 70 formed on the windshield 500 is large even if the movement distance or the rotation angle of the concave mirror 30 is small. In addition, the variation of the view box E may become large. Thus, the drive unit 300 can include a stepping motor which is capable of finely adjusting the movement or rotation of the concave mirror 30, but another configuration capable of moving the concave mirror is possible.

In the embodiment of the present invention, the controller 100 controls the drive unit 300 to move the concave mirror 30 in order to move the view box E, which is the area in which the driver can view the entire image containing the driving information, when the sensing unit 200 senses that the position of the driver has varied. Further, the movement of the concave mirror 30 includes a vertical or horizontal rotation of the concave mirror 30.

Referring again to FIG. 2, the controller 100 controls the drive unit 300 so as to rotate the concave mirror 30 downward and correspondingly move the view box E upward when the sensing unit 200 senses that the position of the driver has moved upward. The position of the driver that has moved may correspond to the driver lifting their head upward, the driver moving their eyes upward, and a different person, who is tall, is driving the vehicle. In addition, the downward rotation of the concave mirror 30 corresponds to the clockwise rotation of the concave mirror 30 based on the illustration of FIG. 2.

In addition, the controller 100 can control the drive unit 300 so as to rotate the concave mirror 30 upward and correspondingly move the view box E downward when the sensing unit 200 senses that the position of the driver has moved downward.

Figure 5:
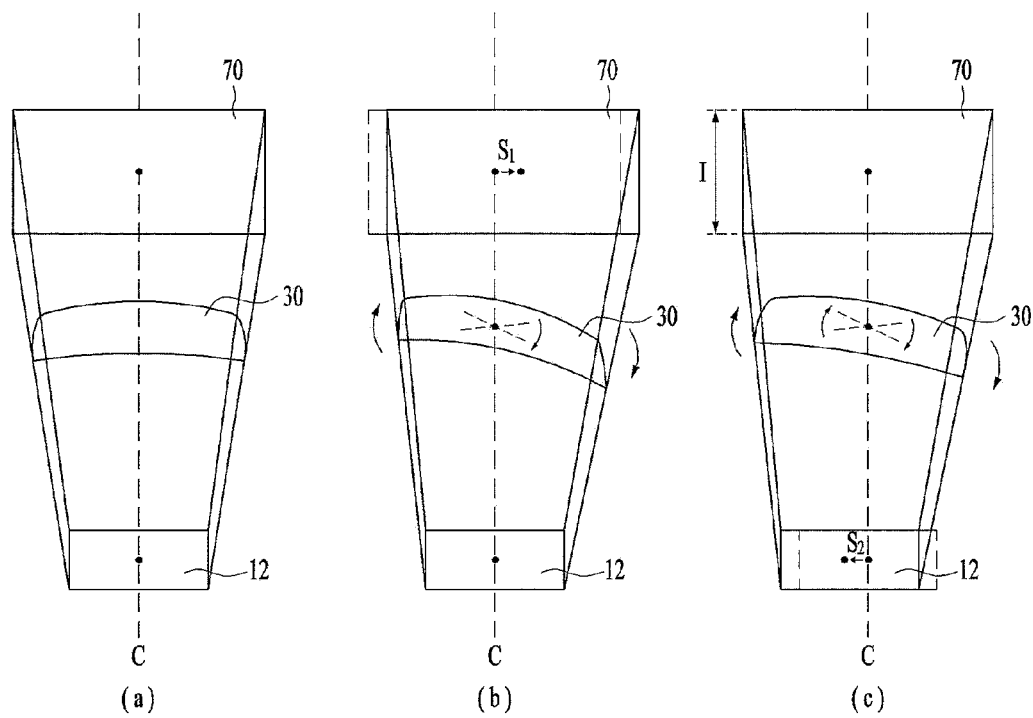
FIG. 5 is a view illustrating the correction of the position of a virtual image in accordance with an embodiment of the present invention.
Figure 6:
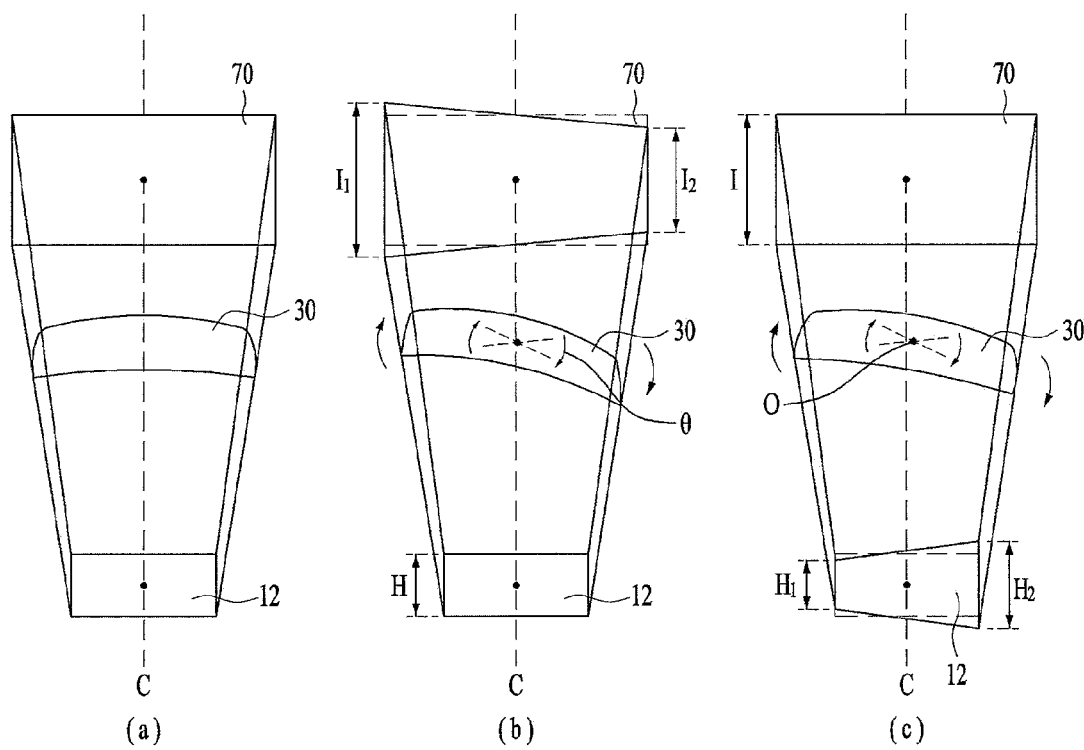
FIG. 6 is a view illustrating the correction of the magnification of a virtual image in accordance with an embodiment of the present invention.

Next, FIG. 5 is a view illustrating the correction of the position of the virtual image, and FIG. 6 is a view illustrating the correction of the magnification of the virtual image according to an embodiment of the present invention. As described above, the controller 100 can correct the position and the magnification of the virtual image 70 by rotating the concave mirror 30 as the position of the driver is moved.

In addition, the controller 100 can control the display panel 10 to correct the position of the virtual image 70 or to correct the magnification of the virtual image 70. In more detail, referring to FIG. 5, the driver may turn their head or eyes leftward while driving the vehicle. Thus, when the sensing unit 200 senses the variation in the position of the driver, the controller 100 controls the drive unit 300 so as to rotate the concave mirror 30 clockwise and correspondingly move the view box E leftward, which allows the entire image of the driving information to be seen by the driver.

Here, the term "clockwise" refers to the direction in which the concave mirror 30 is rotated such that the right side thereof becomes closer to the center line C illustrated in FIGS. 5(a) and 5(b) or the direction in which the concave mirror 30 is rotated rightward when viewing the concave mirror 30 from the top side based on the illustration of FIG. 5. In this instance, as illustrated in FIG. 5(b), the virtual image 70 reflected in the concave mirror 30 moving rightward by a first prescribed distance S1 needs to be corrected.

That is, the movement of the virtual image 70 following the movement of the driver hinders the driving of the driver. In addition, the virtual image 70 does not match the scene in front of the windshield 500.

To solve this problem, as illustrated in FIG. 5(c), the controller 100 controls the position of the image 12 on the display panel 10 so as to be moved leftward by a second prescribed distance S2, in order to correct the rightward movement of the virtual image 70 by the first prescribed distance S1 when the concave mirror 30 is rotated clockwise.

Accordingly, even when the concave mirror 30 is rotated, the virtual image 70 is fixed at the original position thereof, thus not confusing the driver with confusing virtual images. That is, the virtual image 70 is not moved, but is fixed so as to match the forward scene, regardless of variation in the position of the driver. In addition, a similar case applies when the position of the driver is moved rightward. Similarly, when the position of the driver is moved upward or downward, the position of the virtual image 70 can be corrected by the same method, and thus a repetitive detailed description thereof is omitted.

Next, referring to FIG. 6, when the position of the driver is moved leftward, the concave mirror 30 is rotated clockwise so as to move the view box E. As illustrated in FIGS. 6(a) and 6(b), when the concave mirror 30 is rotated clockwise, the distance from the right side of the image to the concave mirror 30 is different from the distance from the concave mirror 30 to the left side of the virtual image 70.

As illustrated in FIG. 6(b), the height H of the image 12 output from the display panel 10 is assumed to be constant. When the concave mirror 30 is rotated clockwise, the right side of the image 12 becomes closer to the concave mirror 30, and therefore the right side of the virtual image 70 is reduced. Further, the left side of the image 12 becomes farther away from the concave mirror 30, and therefore the left side of the virtual image is enlarged.

That is, assuming that the height of the virtual image 70 before the rotation of the concave mirror 30 is "I", the left side $I_1$ of the virtual image 70 is enlarged, and the right side $I_2$ of the virtual image 70 is shrunk. Accordingly, the virtual image 70 to be seen by the driver can undergo distortion unlike the image on the display panel. Thus, the distorted virtual image provides the driver with incorrect information.

In order to solve this problem, the controller 100 controls the image 12 on the display panel 10 such that the ratio of the right side $H_2$ of the image 12 to the left side $H_1$ thereof becomes greater than 1, in order to prevent the ratio of the left side $I_1$ of the virtual image 70 to the right side $I_2$ thereof from becoming greater than 1 when the concave mirror 30 is rotated clockwise.

That is, the image 12 on the display panel 10 is output so as to be reduced on the right side and enlarged on the left side. Accordingly, the final virtual image 70, to be seen by the driver, has the same or similar ratio or size to that of the virtual image 70, that was seen before the concave mirror 30 was rotated. This method can be equally applied to when the concave mirror 30 is rotated counterclockwise, or rotated upward or downward.

Figure 7:
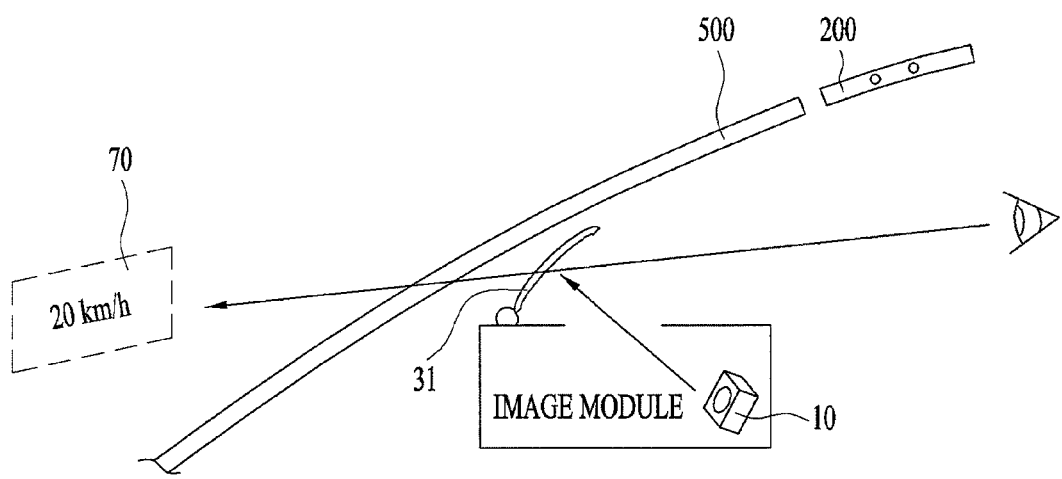
FIG. 7 is a view illustrating a combiner type display device in accordance with another embodiment of the present invention.

Next, FIG. 7 is a view illustrating a combiner type display device in accordance with another embodiment of the present invention. As shown, the display device includes the display panel 10 providing an image containing driving information, a combiner 31 reflecting a portion of the image 12 and transmitting a remaining portion of the image 12 so as to cause the driver to view a virtual image, the sensing unit 200 sensing the position of the driver, and the drive unit 300 moving the combiner 31. Further, the controller 100 is connected to the display panel 10, the sensing unit 200, and the drive unit 300.

Thus, the controller 100 can control the drive unit 30 so as to move the combiner 31, in order to move the view box E in which the entire image 12 containing the driving information is seen by the driver when the sensing unit 200 senses variation in the position of the driver. The drive unit 300 can also vertically or horizontally rotate the combiner 31.

Further, the controller 100 can control the drive unit 300 so as to rotate the combiner 31 upward and correspondingly move the view box E downward when the sensing unit 200 senses that the position of the driver has been moved downward. The controller 100 can also control the display panel 10 so as to correct the position or the magnification of the virtual image 70 when the combiner 31 is rotated as the position of the driver is moved.

The combiner 31 thus functions to enlarge the image on the display panel 10, similar to the concave mirror. In place of the windshield, the combiner 31 reflects the image to the driver. The reflected image is seen by the driver as a virtual image that has passed through the combiner 31 and is formed in front of the combiner 31. The combiner 31 may be formed of a semi-transparent material, which reflects an image and transmits light so as not to block the driver's view.

In addition, the display device in accordance with one embodiment of the present invention may further include a Fresnel lens between the concave mirror 30 and the windshield 500. That is, the image reflected by the concave mirror 30 can pass through the Fresnel lens. The Fresnel lens is a condensing lens that serves to gather light, like a convex lens while having a reduced thickness. Here, the lens having a reduced thickness can serve as a convex lens because the lens is divided into several bands, each acting as a prism, so as to reduce aberrations.

In addition, it is preferable to reduce the difference in the indices of refraction in order to focus light on one location. Therefore, the Fresnel lens has numerous concentric grooves formed in the surface thereof, thus focusing light on one location thanks to the adjustment in the index of refraction by the grooves.

Accordingly, providing the Fresnel lens between the concave mirror 30 and the windshield 500 enlarges the image, and reduces the length of the path of the image. The use of the Fresnel lens also minimizes the volume of the HUD device, helps realize the same size of image even if the size of the concave mirror 30 is reduced, and allows a larger image to be displayed on the windshield 500.

In addition, as discussed above with respect to FIG. 4, the display device may further include the notification module 900 for transmitting a warning message to the driver via, for example, sound. When the sensing unit 200 senses that the position of the driver deviates from the view box E despite the rotation of the concave mirror 30, the controller 100 can provide the driver with a warning message such as a sound or an image announcing that the driver excessively deviates from the view box E.

Therefore, the present invention provides several advantages. For example, the present invention provides a display device, which minimizes the volume of a HUD device, thereby allowing the HUD device to be easily installed in a vehicle having a limited space. In addition, the present invention provides a display device, which provides a larger view box than a view box that can be made using the concave mirror provided in a general HUD device.

Although the exemplary embodiments have been illustrated and described as above, of course, it will be apparent to those skilled in the art that the embodiments are provided to assist understanding of the present invention and the present invention is not limited to the above described particular embodiments, and various modifications and variations can be made in the present invention without departing from the spirit or scope of the present invention, and the modifications and variations should not be understood individually from the viewpoint or scope of the present invention.

What is claimed is:

1. A Head Up Display (HUD) device in a vehicle, comprising:
   a display panel configured to output an image containing driving information;
   a concave mirror configured to reflect the image to a windshield of the vehicle, so as to display a virtual image via the windshield in a forward direction of a driver of the vehicle, wherein the virtual image corresponds to a view box being an area in which the entire image containing the driving information is seen by the driver;
   a sensing unit configured to sense a position of the driver;
   a drive unit configured to move the concave mirror; and
   a controller configured to control the drive unit to move the concave mirror in order to correspondingly move the view box when the sensing unit senses a variation in the position of the driver,
   wherein the controller is further configured to control the display panel to correct a position of the virtual image so that the virtual image is fixed so as to match a scene in front of the windshield when the concave mirror is rotated as the position of the driver moves.

2. The HUD device according to claim 1, wherein the sensing unit is further configured to sense a movement of the driver's head or pupils.

3. The HUD device according to claim 2, wherein the drive unit is further configured to rotate the concave mirror without moving a center position of the concave mirror.

4. The HUD device according to claim 1, wherein the drive unit is further configured to rotate the concave mirror vertically or horizontally.

5. The HUD device according to claim 1, wherein the controller is further configured to control the drive unit to rotate the concave mirror downward and correspondingly move the view box upward when the sensing unit senses that the position of the driver has moved upward.

6. The HUD device according to claim 1, wherein the controller is further configured to control the drive unit to rotate the concave mirror upward and correspondingly move the view box downward when the sensing unit senses that the position of the driver has moved downward.

7. The HUD device according to claim 1, wherein the controller is further configured to move the image on the display panel leftward by a second prescribed distance, in order to correct a rightward movement of the virtual image by a first prescribed distance when the concave mirror is rotated clockwise.

8. The HUD device according to claim 1, wherein the controller is further configured to control the display panel to correct a magnification of the virtual image when the concave mirror is rotated as the position of the driver moves.

9. The HUD device according to claim 8, wherein the controller is further configured to control the image on the display panel such that a ratio of a right side of the image to a left side of the image is greater than 1, in order to prevent a ratio of the left side of the virtual image to a right side of the virtual image from becoming greater than 1 when the concave mirror is rotated clockwise.

10. A Head Up Display (HUD) device in a vehicle, comprising:
a display panel configured to output an image containing driving information;
a combiner configured to reflect a portion of the image towards a driver of the vehicle and to pass a remaining portion of the image to a windshield of the vehicle, so as to display a virtual image via the windshield in a forward direction of a driver of the vehicle, wherein the virtual image corresponds to a view box being an area in which the entire image containing the driving information is seen by the driver;
a sensing unit configured to sense a position of the driver;
a drive unit configured to move the combiner; and
a controller configured to control the drive unit to move the combiner in order to move the view box when the sensing unit senses a variation in the position of the driver,
wherein the controller is further configured to control the display panel to correct a position of the virtual image so as to match a scene in front of a windshield when the combiner is rotated as the position of the driver is moved.

11. The HUD display device according to claim 10, wherein the drive unit is further configured to rotate the combiner vertically or horizontally.

12. The HUD device according to claim 10, wherein the controller is further configured to control the drive unit to rotate the combiner downward and correspondingly move the view box upward when the sensing unit senses that the position of the driver has moved upward.

13. The HUD display device according to claim 10, wherein the controller is further configured to control the drive unit to rotate the combiner upward and correspondingly move the view box downward when the sensing unit senses that the position of the driver has moved downward.

14. The HUD display device according to claim 10, wherein the controller is further configured to control the display panel to correct magnification of the virtual image when the combiner is rotated as the position of the driver is moved.

15. The HUD device according to claim 10, wherein the sensing unit is further configured to sense a movement of the driver's head or pupils.

* * * * *